United States Patent [19]

Boulton et al.

[11] E Patent Number: Re. 33,650

[45] Reissued Date of Patent: Jul. 30, 1991

[54] DETERMINISTIC ACCESS PROTOCOL LOCAL AREA NETWORK

[75] Inventors: P. I. P. Boulton; E. S. Lee, both of Islington, Canada

[73] Assignee: University of Toronto Innovations Foundation, Toronto, Canada

[21] Appl. No.: 515,639

[22] Filed: Apr. 27, 1990

Related U.S. Patent Documents

Reissue of:

[64] Patent No.: 4,777,487
Issued: Oct. 11, 1988
Appl. No.: 890,917
Filed: Jul. 30, 1986

[51] Int. Cl.[5] ..... H04Q 9/00
[52] U.S. Cl. ..... 340/825.5; 370/85
[58] Field of Search ..... 340/825.5, 825.51; 370/85, 94, 60

[56] References Cited

U.S. PATENT DOCUMENTS

| | | | |
|---|---|---|---|
| 3,603,935 | 9/1971 | Moore | 364/200 |
| 3,947,824 | 3/1976 | Doehle et al. | 364/900 |
| 4,347,498 | 8/1982 | Lee et al. | 340/825.02 |
| 4,514,843 | 8/1985 | Albanese | 370/93 |
| 4,570,126 | 2/1986 | Demmer et al. | 329/107 |
| 4,570,162 | 2/1986 | Boulton et al. | 340/825.5 |
| 4,586,128 | 4/1986 | DeWoskin | 340/825.5 |
| 4,608,700 | 8/1986 | Kirtley, Jr. et al. | 370/85 |
| 4,727,479 | 2/1988 | Kirrman | 340/825.51 |
| 4,773,069 | 9/1988 | Boulton et al. | 371/7 |

FOREIGN PATENT DOCUMENTS 0034903 2/1981 European Pat. Off. .

OTHER PUBLICATIONS

Kiesel, W. M., Kuehn, P., CSMA-CD-DR: A New Multi-Access Protocol For Distributed Systems, 1981, pp. A 2.4.1-A 2.4.6.

Albanese, A., Star Network With Collision-Avoidance Circuits, 7/15/82, pp. 631-638.

Ikeman, H. et al., High-Speed Network Uses Fiber Optics, 10/22/84, pp. 95-100.

*Primary Examiner*—Donald J. Yusko
*Assistant Examiner*—Michael Horabik
*Attorney, Agent, or Firm*—Fleit, Jacobson, Cohn, Price, Holman & Stern

[57] ABSTRACT

A data controller to control passage of data between a plurality of data handling devices comprises a communication link to permit communication of the devices with one another. An indicator is associated with each of the devices to indicate data is to be transmitted from any one of the devices. An inhibitor operates upon a device after it transmits data to inhibit access of that device to the communication link and to the indicator. A reset device is responsive to the indicator to remove the inhibitor when the indicator indicates that no data is to be transmitted.

7 Claims, 5 Drawing Sheets

DETERMINISTIC ACCESS PROTOCOL LOCAL AREA NETWORK

Matter enclosed in heavy brackets [ ] appears in the original patent but forms no part of this reissue specification; matter printed in italics indicates the additions made by reissue.

The present invention relates to data controllers to control the passage of data between a plurality of data handling devices.

Data handling devices are now commonly connected in a network to allow the passage of data between various devices. The network can take one of several forms but each requires a controller to control access to the communication link between the data handling devices to ensure that only one data message at a time is transferred between the devices. The controller is operable once data is being transmitted to inhibit access of other devices to the communication link or to abort disrupted data. The devices conventionally are arranged to continue to attempt transmission on a periodic basis until they are successful in gaining access to the communication link.

Such an arrangement has proven satisfactory but at higher data handling rates it is statistically possible that a device can never gain access to the communications link. Certain applications require a maximum time for a device to gain access to the communication link, that is they require the system to be deterministic, to ensure that data will be communicated from one device to another device within a finite time.

It is therefore an object of the invention to provide a data controller for use in a network that provides a finite time in which transmission of data will occur and to ensure each handling device requesting access to the communication link will achieve a communication link before any one of the handling devices gains access to the communication link for a second time.

According, therefore, to the present invention there is provided a data controller to control passage of data between a plurality of data handling devices comprising communications means to permit communication of said devices with one another, indicator means associated with each of said devices to indicate data is to be transmitted from any one of said devices, inhibit means operable upon a device after transmission of data thereby to inhibit access of that device to said communication means and to said indicator means and reset means responsive to said indicator means to remove said inhibit means when said indicator means indicates that no data is to be transmitted thereby preventing that device from gaining multiple access to said communication means until each of said other requesting devices have gained access to said communication means.

An embodiment of the invention will now be described by way of example only in which FIG. 1 is a schematic representation of a network FIG. 2 is a schematic representation of a controller for use with the network shown in FIG. 1

Figure 1:
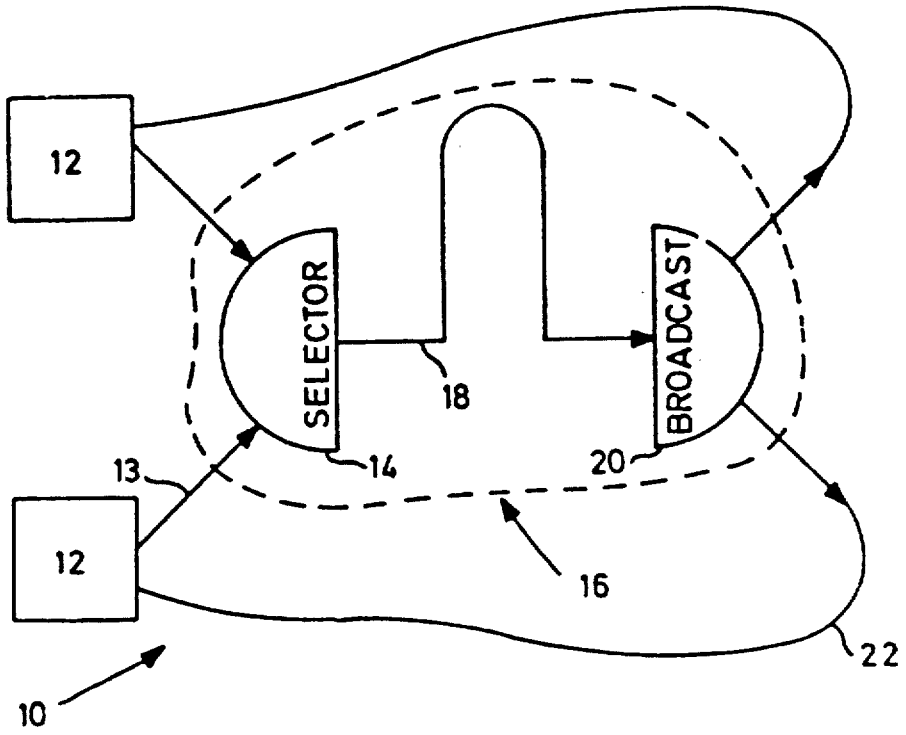

A local area network 10 is arranged in a tree or star format and comprises a number of data handling devices 12, each of which is connected by a transmission link 13 to a selector 14 of a central hub 16. The selector 14 is connected through a nexus 18 to a broadcaster 20, which in turn is connected through transmission links 22 to each of the data handling devices 12.

The selector 14 is operable to select one of the handling devices 12 to receive data through the associated transmission link 13 and broadcast it through each of the links 22 by way of the broadcaster 20. In this way, data from one of the devices 12 can be communicated to each of the devices 12.

Figure 2:
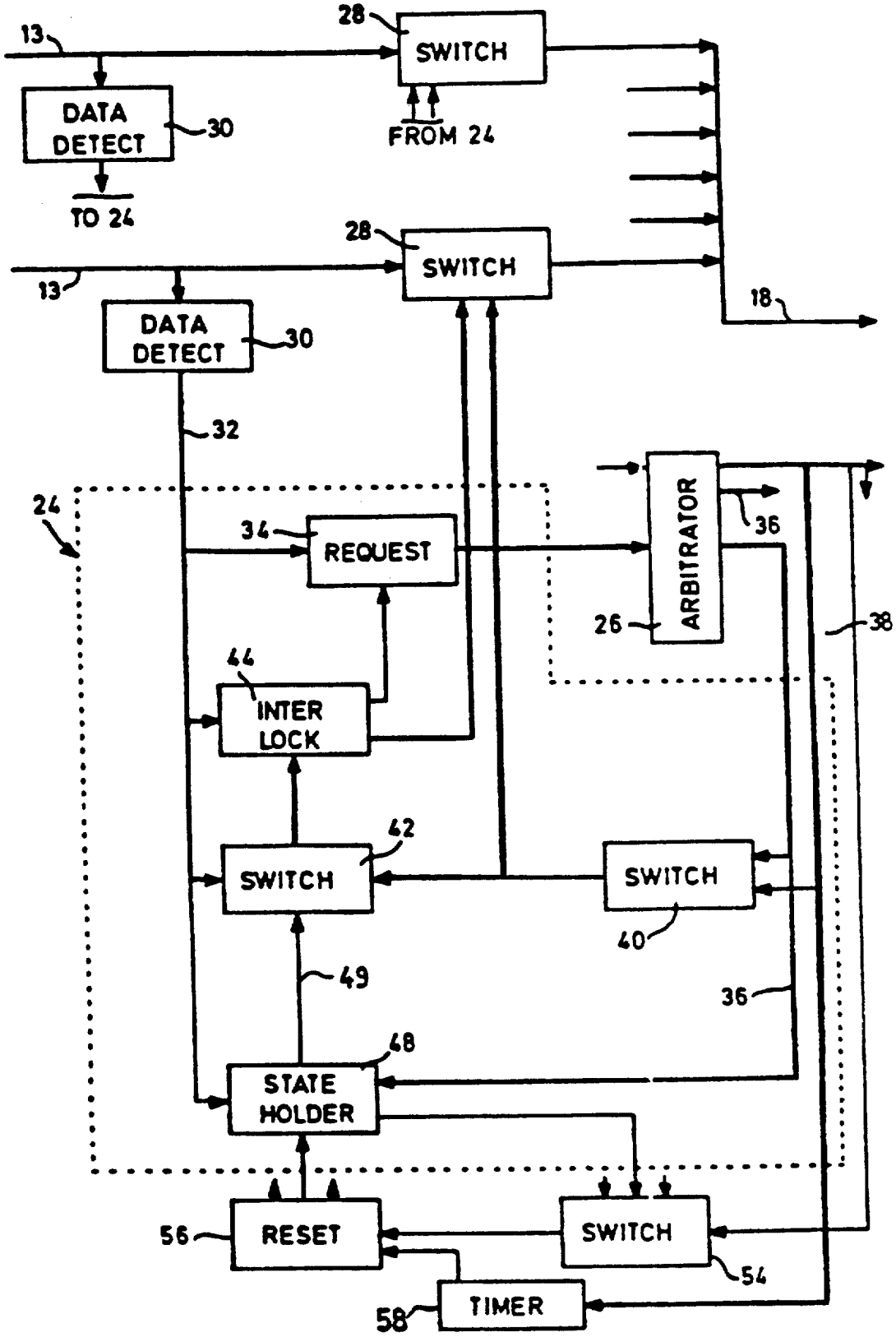

To ensure that only one data message is transmitted, selector 14 includes one selection device 24 per transmission link 13, and an arbitrator 26 as shown in FIG. 2. The selection device 24 is identical in many ways to that described in U.S. Pat. No. 4,570,162, issued to the present applicants, the contents of which are incorporated herein by reference.

Each of the transmission links 13 is connected through a switch 28 to the nexus 18. Operation of the switch 28 is controlled by a selection device 24 and is operable to pass data from the link 13 to the nexus 18 only upon enablement by the selection device 24. Each transmission link 13 is also connected to a distinct data detect function 30 whose output 32 is connected to a request function 34. The output of the request function 34 is applied to the arbitrator 26. The arbitrator 26 receives an input from the request function associated with each of the transmission links 13 and determines which of the links 13 will be selected for transmission through the nexus 18.

The arbitrator 26 has a plurality of outputs 36 each of which is connected to a respective one of selection devices 24, and an output 38 that is connected to all of the selection devices 24 and provides a busy signal to each of the selection devices.

The selected output 36 and the busy signal 38 are applied to a switch function 40 to indicate that the link 13 associated with that particular selection device 24 has been selected. The output of switch function 40 is applied to the switch 28 and to a switch 42 that receives a further input from the data detect output 32. The output of switch 42 controls the operation of an interlock function 44, which also is connected to the data detect output 32. The output of the interlock function 44 is applied to the request function 34 and to switch 28 to enable the switch and allow data to be transmitted from the link 13 to the output 18. The interlock 44 inhibits the request function from operating until after the nexus 18 has become idle as indicated by the busy signal 38 and a new transmission of data has been detected by the data detect function 30. In this way the transmission of a partial packet of data is avoided.

The construction and operation of the components described above is described in further detail in U.S. Pat. No. 4,570,126 and therefore it is not believed to be necessary to describe them further at this time.

To ensure that the selector 14 is deterministic, each selection device 24 includes a state holder function 48 that combines an inhibitor function 50 and state indicator function 52. The output 32 of data detect function 30 is applied to the state indicator 52 whose output is applied as one of the inputs to a switch 54. The switch 54 receives inputs from the state indicators of all selection devices 24 and a signal from the busy line 38. The output of switch 54 is applied to a reset function 56 whose output is connected to the inhibitor 50 in each of the selection devices 24. The reset function 56 also receives an input from a timer 58.

The selected signal 36 is applied to the inhibitor 50 and state indicator 52, and the output of inhibitor 50 is applied to the switch 42 by way of connector 49 to inhibit operation of that switch.

Figure 3:
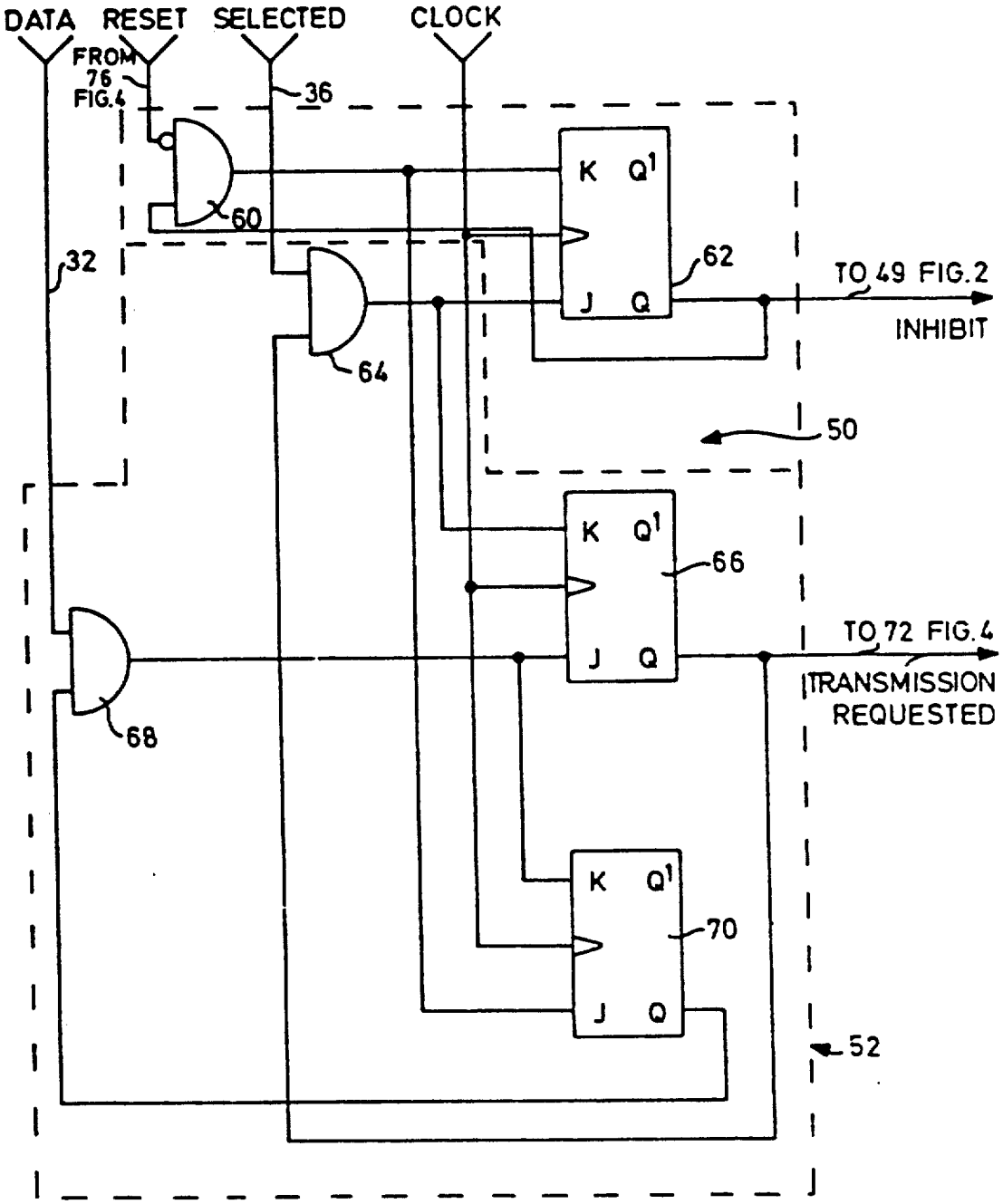
FIG. 3 is a detailed view of one of the components shown in the schematic representation of FIG. 2

As may be seen in FIG. 3, the inhibitor 50 includes an AND gate 60 and a JK Flip-Flop 62. The inputs to the AND gate 60 are derived from the inverted output of the reset function 56 and from the Q output of the JK Flip-Flop 62. The output of AND gate 60 is applied to the K input of Flip-Flop 62. The J input to Flip-Flop 62 is derived from the output of an AND gate 64 in the state indicator 52, AND gate 64 receives as one of its inputs the selected signal 36 and as its other input the Q output of a JK Flip-Flop 66. The Flip-Flop 66 receives the output of AND gate 64 at its K input and the output of an AND gate 68 at its J input.

The AND gate 68 receives one input from the output 32 of data detect function 30 and as its other input the Q output of a further JK Flip-Flop 70. The K input to Flip-Flop 70 is connected to the J input of Flip-Flop 66 with the J input to Flip-Flop 70 being connected to the output of AND gate 60 on the inhibitor 50. The output of JK Flip-Flop 66 is also applied to the switch function 54.

Figure 4:
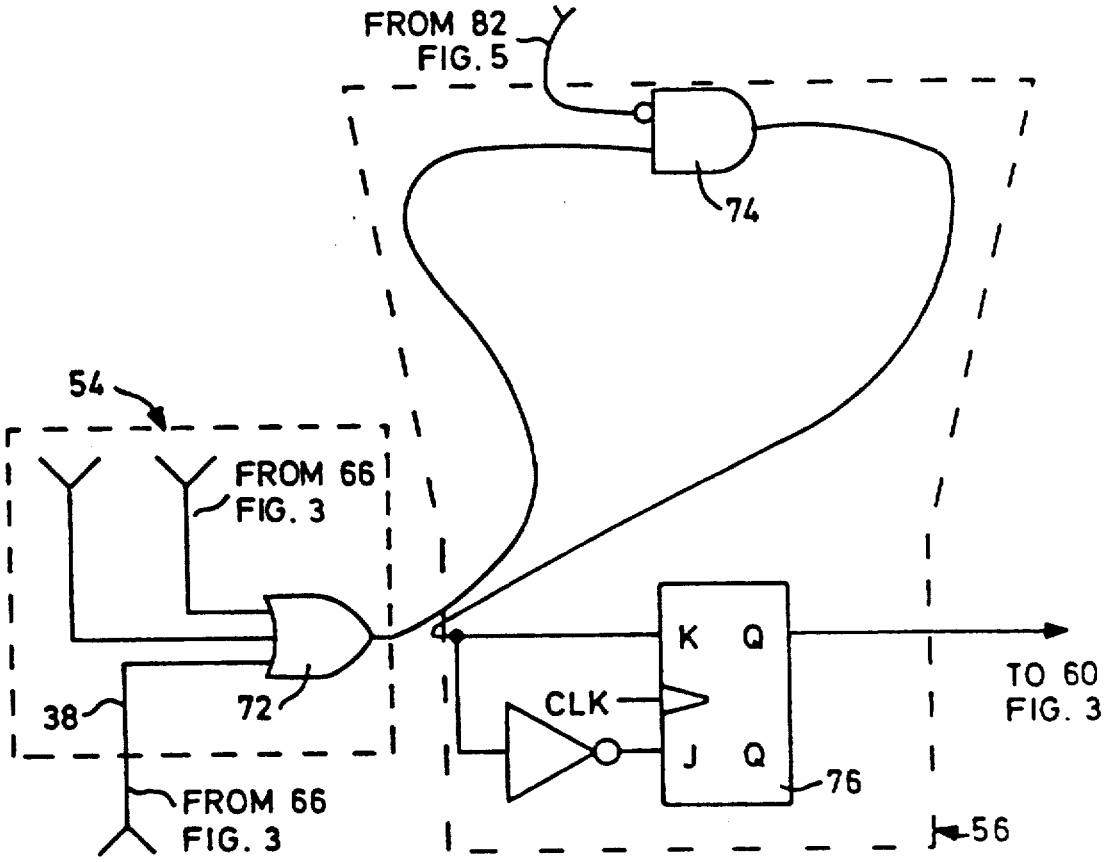
FIG. 4 is a schematic representation of a further component shown in the representation of FIG. 2

As may be seen in FIG. 4, the switch function 54 is essentially an OR gate 72 that receives inputs from each of the JK Flip-Flops 66 and the busy signal 38. The output of OR gate 72 is passed through an AND gate 74 to the input of a JK Flip-Flop 76 both forming part of the reset device 56. The K input to Flip-Flop 76 is derived directly from the output of AND gate 74 and the J input is the inverted output of AND gate 74. The output of the reset device 56 utilizes the Q' output which is applied as the input to the AND gate 60 in FIG. 3.

Figure 5:
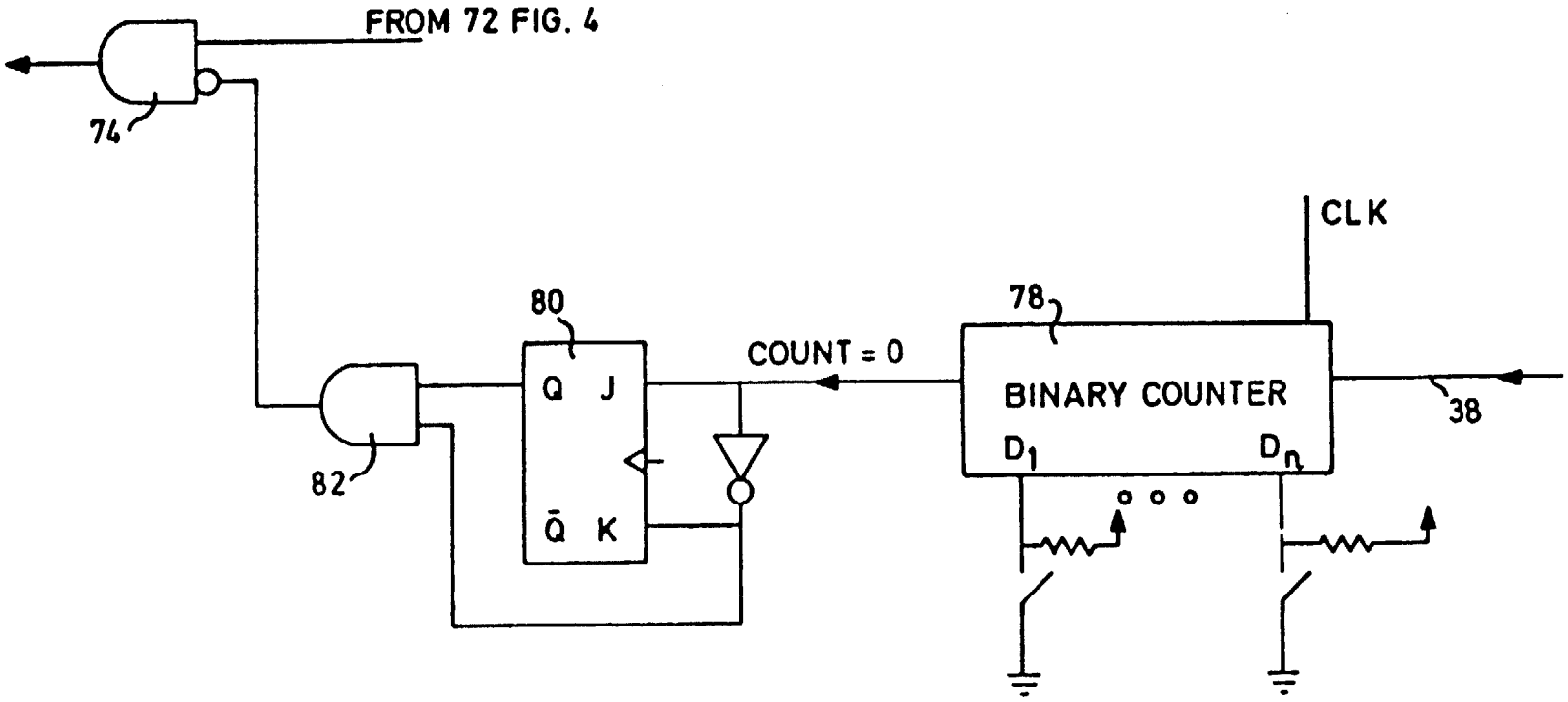
FIG. 5 is a schematic representation of a further component of the system shown in FIG. 2.

The AND gate 74 receives as one of its inputs the output of OR gate 72 and as the other input the inverted output of the timer 58 indicated in further detail on FIG. 5. The timer 58 includes a binary down counter 78 that is loaded by a signal appearing on the busy line 38. The output (count =0) of binary counter 78 is applied directly to the J input of a JK Flip-Flop 80 and inverted and applied to the K input of the same Flip-Flop. The inverted output is also applied as one input to an AND gate 82 which receives as its other input the Q output of Flip-Flop 80. The output of AND gate 82 is applied to the inverted input of the AND gate 74.

The operation of the data controller will now be described, assuming the network is at idle, that is no data is being transmitted and that no date is available for transmission. In this situation, all the data detect outputs 32 are low, or de-asserted, and all the inputs to switch 54 are also low, or de-asserted The busy line 38 is also low and the output of reset 56 is low. Referring to FIG. 3, the Q outputs of each of the JK Flip-Flops 62, 66 are low but the Q output of Flip-Flop 70 is high, providing one high input to AND gate 68.

Upon the detection of a transmission from one of the data handling devices 12 through the link 13, the associated data detect function 30 asserts the signal on output 32 which is passed through request function 34 to the arbitrator 26. As there are no other requests received at arbitrator 26 the request is accepted and the selected line 36 corresponding to the link 13 is asserted together with the busy line 38 to enable switch 40. Because the request is accepted at the start of data transmission, the interlock 44 is idle so that switch 28 receives two enabling signals to allow it transmit data from the link 13 to the nexus 18.

The assertion of output 32 causes the state holder 48 to change from an "idle" to a "contention" condition. This results in a high output from the state indicator 52 to the switch function 54 to indicate that transmission of data has been requested. As will be appreciated from FIG. 3, the presence of a high signal at output 32 results in an output from AND gate 68 so that at the next clock cycle the Q output of Flip-Flop 66 is asserted. As may be seen from FIG. 4, the assertion through output from state indicator 52 and through the busy line 38 produces a high signal from OR gate 72 which, in turn, produces a high output from AND gate 74 as the low output from the timer 58 is inverted at one input to AND gate 74. The high output of AND gate 74 produces low and high outputs at the J and K inputs of Flip-Flop 76, respectively, to produce a high output at the Q' gate of reset function 56 at the next clock cycle. The asserted output from the reset 56 is applied to the inverted input of AND gate 60 so that a low output is obtained for applying to the K input of Flip-Flop 62.

If the data detect function output 32 goes low, the output of AND gate 68 reverts to a low condition but the Q output of Flip-Flop 66 remains high to continue to assert an input to the switch function 54. However, the presence of a high signal at the K input to Flip-Flop 70 when data detect line 32 is high causes the Q output to go low, providing a low input to AND gate 68 to disable the AND gate until the Q output from Flip-Flop 70 is reset to high. This prevents a further high signal being generated by Flip-Flop 66 until the reset function 56 resets Flip-Flop 70.

The output to Flip-Flop 66 is de-asserted upon a selected signal being received on line 36 to the input of AND gate 64. The other input to AND gate 64 is high by virtue of the assertion of the output of Flip-Flop 66 so that a high output is obtained from AND gate 64 and asserted against the J input of Flip-Flop 66. Upon the next clock pulse, regardless of the state of the J input to Flip-Flop 66, the assertion of a high signal at the K input causes the Q output to revert to a low condition, therefore de-asserting the input to switch function 54. At the same time, a high output from AND gate 64 is applied to the J input of Flip-Flop 62 and the Q output of Flip-Flop 66 goes high to provide a high inhibit output to switch 42. This prevents further processing of data through the request function 34.

The output from switch function 54 remains asserted whilst data is being transmitted by virtue of the busy signal 38. Once transmission of data has been completed, and assuming that no other link 13 has attempted to gain access during the transmission of that data, all the inputs to OR gate 72 are low, causing a low output from the OR gate 72. This causes the J input of Flip-Flop 76 to be asserted causing the Q' output to change from high to low. The low signal is applied to the inverted input to AND gate 60, which, together with the high output from Flip-Flop 62, provides a high signal at the K input to Flip-Flop 62. Upon the next clock pulse the Q output of Flip-Flop 62 will be de-asserted to release the inhibit signal on switch function 42. The high output from AND gate 60 is also applied to the J input of Flip-Flop 70 so that the Q output reverts to high condition at the next clock pulse. This is applied to one of the inputs of AND gate 68 so that upon the next data detection signal on line 32 the state indicator 52 will be conditioned to "contention".

If, during the course of transmission of data, an attempt is made to transmit data from another of the data handling devices 12, the state indicator 52 associated with that device will assert an output to the switch 54. Thus, upon completion of transmission by one of the data handling devices, the output of the OR gate 72 remains high so that the Q' output from Flip-Flop 76 remains low. This then prevents the Flip-Flop 62 from being reset to de-assert the inhibit output to switch 42. This condition will remain until each of the inputs to the switch function 54 have been de-asserted indicating that data from the device associated with that state indicator has been selected and allowing the output from Flip-Flop 76 to return to a high condition and remove each of the inhibiting outputs from the respective Flip-Flops 62. Accordingly, it will be appreciated that each link is assured to access to the nexus 18 in a finite time and the nexus 18 cannot be occupied by repetitive transmissions from other data handling devices.

To ensure that the network 10 is not disabled by a malfunction in one of the data handling devices that results in a continuous assertion against switch 54, the timer of FIG. 5 is used to reset the inhibit functions 50 after a predetermined period. This period is chosen to be slightly longer than the retry period for each of the devices 12. The timer in FIG. 5 functions to load the binary counter 78 and initiate down count of that counter upon termination of the busy signal in line 38. If a signal is asserted at switch 54, under normal operation the device associated with that signal would attempt to gain access to the nexus 18 during the period being counted by the counter 78. Upon gaining access, the line 38 would revert to a busy condition and reload the counter, holding it until the busy signal again is de-asserted. If the counter completes its count prior to the reassertion of the busy signal 38, the Flip-Flop 80 and AND gate 82 provide a pulse to the inverted input of AND gate 74. This causes the output of 74 to go low and reset Flip-Flop 76 to a low condition. This is then applied to the AND gate 60 to reset Flip-Flop 62 and remove the inhibit signals from the switches. Thereafter, the output of AND gate 82 reverts to a low condition to allow the AND gate 74 to function in response to the output from OR gate 72.

It will be seen, therefore, that by monitoring the data detect signal and providing an indication that data transmission is required, it is possible to ensure that requests made during data transmission are dealt with prior to any new requests from a device that has already been transmitted. Whilst it will be appreciated that the operation has been described with respect to the selection device 24 described in the above-referenced U.S. patent, it is equally applicable to other selection devices where the indicator and inhibitor can be utilized to inhibit the operation of the equivalent of the selection device 24 until all requests have been dealt with.

We claim:

1. A data controller to control passage of data between a plurality of data handling devices comprising communication means to permit communication of said devices with one another, indicator means associated with each of said devices to indicate data is to be transmitted from any one of said devices, inhibit means operable upon a device after transmission of data thereby to inhibit access of that device to said communication means and said indicator means and reset means responsive to said indicator means *including a means to monitor each of said indicator means and provide a first signal to maintain said inhibit means when at least one of said indicator means indicates data is to be transmitted and a second signal* to remove said inhibit means when *each of the plurality of* said indicator means [indicates] *indicate* that no data is to be transmitted, thereby preventing that device from gaining multiple access to said communication means until each of said other requesting handling devices have gained access to said communication means.

2. A data controller according to claim 1 including override means operable upon said reset means after a predetermined period.

3. A data controller according to claim 1 wherein said indicator means includes a plurality of state indicators each associated with a respective one of said devices and having an indication output changeable from a first condition to a second condition upon data being transmitted by the respective device.

4. A data controller according to claim 3 wherein said indication output of said state indicator is changed from said second condition to said first condition upon reception of an access acquired signal indicating that the respective one of said devices has been connected to said communication means.

5. A data controller according to claim 4 wherein said indication output initiates operation of said inhibit means.

[6. A data controller according to claim 4 wherein the indication outputs of each of said state indicators are applied to said reset means, operation of said reset means being prevented by any of said indication outputs maintaining said second condition.]

7. A data controller according to claim [6] *5* wherein operation of said reset means is prevented during transmission of data on said communication means.

8. A data controller according to claim [6] *5* further including override means operable upon said reset means after a predetermined period.

* * * * *